F. RAMPONE.
VALVE FOR FLUID TANKS AND LIKE STRUCTURES.
APPLICATION FILED DEC. 23, 1914.
1,273,537.
Patented July 23, 1918.
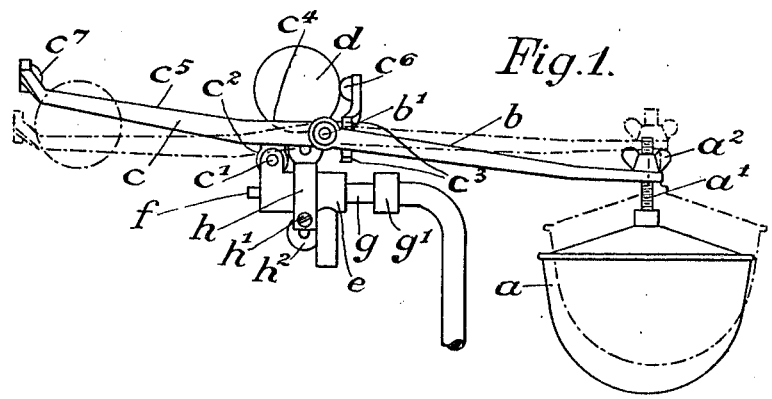
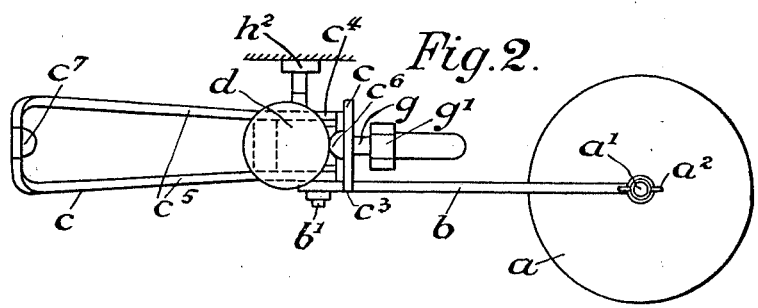
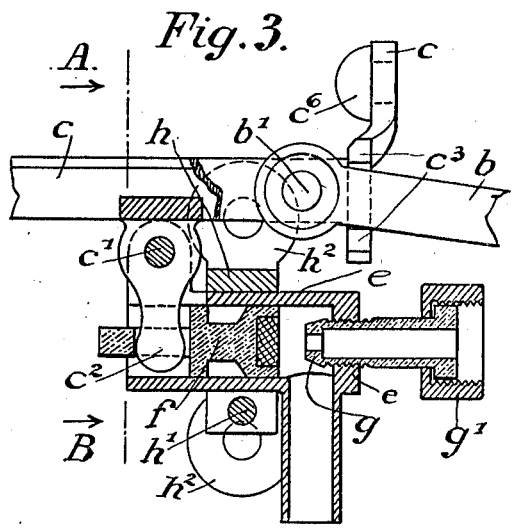
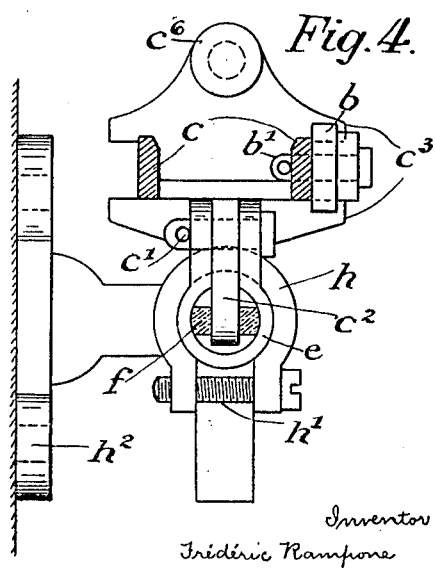

UNITED STATES PATENT OFFICE.

FRÉDÉRIC RAMPONE, OF NEUCHATEL, SWITZERLAND.

VALVE FOR FLUID-TANKS AND LIKE STRUCTURES.

1,273,537.

Specification of Letters Patent.

Patented July 23, 1918.

Application filed December 23, 1914. Serial No. 878,682.

*To all whom it may concern:*

Be it known that I, FRÉDÉRIC RAMPONE, a subject of the King of Italy, residing at Neuchatel, Roches 2, in the Confederation of Switzerland, have invented certain new and useful Improvements in Valves for Flush-Tanks and like Structures, of which the following is a specification.

The object of this invention is the provision of a float cock for scouring basins and other vessels, one form of which is hereinafter described.

In the drawing:

Figure 1 is a side elevation.

Fig. 2 is a plan view.

Fig. 3 is a partial vertical section on an enlarged scale, and

Fig. 4 is a section on line A—B, Fig. 3.

A float $a$ is attached to the end of a lever $b$ by a screw bolt $a'$ in such a manner that the screw bolt $a'$ is movable in the hole in said lever through which it passes. The extent of this sliding movement is limited and made adjustable by a nut $a^2$. Depending upon the adjustment of the nut $a^2$ the relative distance between float and lever end in their extreme positions may be regulated and thereby also the height of level line of the water in a tank not shown in the drawing. The lever $b$ is pivotally or otherwise connected at $b'$ to one of two rails. These rails are connected by cross bars and a looped part so as to form a frame $c$ upon which a freely rolling ball $d$ travels for the purpose of opening and shutting a valve as will be explained hereinafter. The frame $c$ is provided with an arm $c^2$ depending from one of its cross bars and lying between two lugs on a pipe fitting $e$, and to which it is pivotally connected as at $c'$. The lower end of the depending arm $c^2$ extends into a slot provided therefor in the stem of a piston $f$ of a valve contained within said pipe fitting $e$.

The lever $b$ is free to swing between two stops $c^3$ secured to one of the cross bars of the frame $c$. The two side rails of the frame $c$ run parallel to each other for a portion of their length at one side of the pivotal point $c'$ as indicated at $c^4$ and diverge from each other for another portion $c^5$ of their length extending from the other side of the pivotal point $c'$ in such a way that the ball $d$ is free to roll off the parallel portions $c^4$ toward the diverging portions $c^5$ of the frame $c$, even when the parallel portions $c^4$ are in a horizontal position and when it is therefore acting with its maximum force against the valve. At the two extremities of the frame $c$ the yielding buffers $c^6$ and $c^7$ are provided in order to absorb the shocks which would otherwise be imparted to the frame by the ball $d$ and to prevent any injurious effect on the apparatus. A valve seat $g$ facing the piston $f$ is screwed into the pipe fitting $e$ and is made adjustable therein with regard to piston $f$ which is operated by the arm $c^2$ of the frame $c$. The relative positions of piston $f$ and the valve seat $g$ determining the opening and shutting off the valve.

The pipe fitting $e$ is clamped by means of a yoke $h$ carried by a bracket $h^2$ and a screw $h'$, and therefore irrespective of the inclination of the wall whereon the bracket $h^2$ is mounted, the pipe fitting may be so placed that the frame $c$ will swing in a vertical plane. There is some overweight of the float $a$ as compared to the ball $d$. This overweight is such, that, when there is no water in the tank the arm $b$ will act on the lower stop $c^3$ of the frame $c$ and will move the same into the position shown in full lines in Fig. 1, in which diverging portions $c^5$ of the frame assume an inclined position causing ball $d$ to roll into the parallel portions $c^4$ and to keep the valve, the piston of which has been already removed from the seat by the arm $c^2$, in an open condition for the admission of the water. But as the float rises with the rising water in the tank it pushes the lever $b$ against the upper stop $c^3$ causing the frame $c$ to assume the position shown in Fig. 1 in interrupted lines. As soon as the parallel portions $c^4$ of the frame $c$ have been brought into a slightly inclined position and before the arm $c^2$ has shut the valve the ball $d$ will roll toward diverging portions $c^5$ and will cause the complete shutting of the valve, because the ball after having passed over pivotal point $c'$ acts on the frame $c$ by its overweight. When the valve is shut the diverging portions $c^5$ of the frame extend horizontally but nevertheless the ball $d$ owing to the divergency of the rails will continue its rolling movement until it reaches buffer $c^7$ increasing thereby the pressure exerted by piston $f$ against seat $g$ of the valve and thus insuring the tightness of the same. The complete shutting of the valve is thus effected by the action of ball $d$ at a definite moment, depending on the position of the frame $c$, and at a definite height of the float. Thus a gradual and imperfect shutting of the valve is avoided which difficulties however have to be contended with when the float approaches the end of its upward movement in the ordinary apparatus, where the lever of the float is directly connected with and directly operates the valve.

The incomplete shutting of the valve causes a rapid wear of seat and piston and a disagreeable noise from the rushing action of the flowing water, and this inconvenience increases with the increasing pressure of the water. In an apparatus however made according to the present invention, owing to the fact that the shutting of the valve is caused by the ball $d$ beginning slowly to roll on the parallel portion $c^4$ when this part is still at a slightly inclined position, the closing of the valve will not be effected at once, or with an abrupt movement, and will therefore create no hammer in the piping of the water supply, which is connected to the apparatus by means of the cap $g'$ provided at the end of the seat $g$. Furthermore because the pressure of the piston against the seat of the valve increases only gradually, there will be no cutting of the elastic packing of which the piston is generally made, as would naturally be the case if the closing was effected suddenly with a shock. Likewise the opening of the valve will be complete as soon as the lever $b$ has assumed the position in which the ball $d$ begins to roll toward the pivotal point $c'$.

Instead of using a rolling body on rails connected with a pivoted frame for operating the valve, a sliding body on a guiding rod could be used, or a body mounted in any suitable way on a pivoted frame and having a suitable movement with regard to the lever attached to the float in order to cause the opening and shutting of a valve in two well defined positions of the float.

I claim as my invention:

1. In a valve for flush tanks and similar structures, the combination with a water supply pipe fitting and a piston carrying a valve and a valve seat in said pipe fitting, of a frame pivotally mounted on said pipe fitting, a connection between said frame and piston for operating the latter by the movement of the former, a movable body adapted to travel in said frame, a lever connected to the said frame, and a float connected to the said lever.

2. In a valve for flush tanks and similar structures, the combination with a water supply pipe fitting and a piston carrying a valve and valve seat in said pipe fitting, of a frame pivotally mounted on said pipe fitting and comprising oppositely disposed sides having parallel portions and diverging portions, a connection between the said frame and piston for operating the piston by the movement of the frame, a movable member adapted to travel in the oppositely disposed parallel and diverging portions of the said frame, a lever connected to the said frame, and a float connection to the lever.

3. In a valve for flush tanks and similar structures, the combination with a water supply pipe fitting and a piston carrying a valve and valve seat in said pipe fitting, of a frame comprising oppositely disposed sides, parts of which are parallel and other parts of which are diverging, an arm depending from the said frame and by which the frame is pivotally connected to said pipe fitting, the end of the said arm being adapted to engage with the said piston to move the same by the movements of the frame, a ball adapted to roll between the oppositely disposed side members of the said frame, a lever connected to the said frame, and a float connected to the said lever.

4. In a valve for flush tanks and similar structures, the combination with a water supply fitting and a piston carrying a valve and valve seat in said pipe fitting, of a frame comprising oppositely disposed sides, parts of which are parallel and other parts of which are diverging, an arm depending from the said frame and by which the frame is pivotally connected to said pipe fitting, the end of the said arm being adapted to engage with the said piston to move the same by the movements of the frame, a ball adapted to roll between the oppositely disposed side members of the said frame, stops at the ends of the said frame with which the said ball contacts to limit its travel, a lever pivotally connected to the said frame, stops on the frame determining the movement of the said lever, and a float adjustably connected to the said lever.

5. In a valve for flush tanks and similar structures, the combination with a water supply pipe fitting, a piston carrying a valve and valve seat in said pipe fitting, and a bracket on which the said pipe fitting is adjustably fixed, of a frame comprising oppositely disposed sides, parts of which are parallel and other parts of which are diverging, an arm depending from the said frame and by which the frame is pivotally connected to said pipe fitting, the end of the said arm being adapted to engage with the said piston to move the same by the movements of the frame, a ball adapted to roll between the oppositely disposed side members of the said frame, stops at the ends of the said frame with which the said ball contacts to limit its travel, a lever pivotally connected to the said frame, stops on the frame determining the movement of the said lever, and a float adjustably connected to the said lever.

In testimony whereof I have affixed my signature in presence of two witnesses.

FRÉDÉRIC RAMPONE.

Witnesses:
THÉODORE TMER,
ROD DE N. BOERTUNBERG.

Copies of this patent may be obtained for five cents each, by addressing the "Commissioner of Patents, Washington, D. C."